Oct. 31, 1939.   A. SCHMIDT, JR   2,178,438
VALVE CONVERTING SYSTEM
Filed June 22, 1938
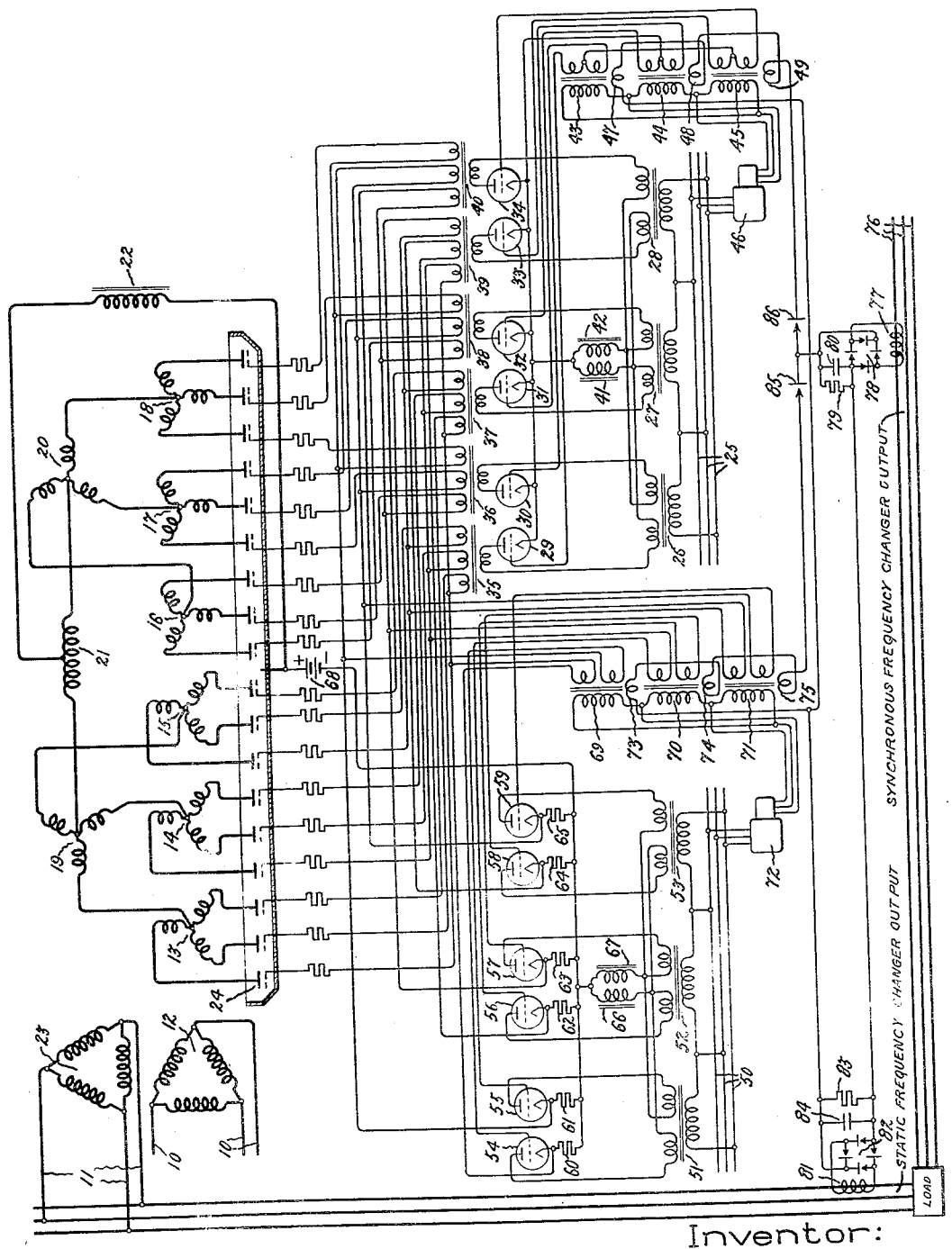
Inventor:
August Schmidt Jr.,
by Harry E. Dunham
His Attorney.

Patented Oct. 31, 1939

2,178,438

UNITED STATES PATENT OFFICE 2,178,438

VALVE CONVERTING SYSTEM

August Schmidt, Jr., Niskayuna, N. Y., assignor to General Electric Company, a corporation of New York Application June 22, 1938, Serial No. 215,152

13 Claims. (Cl. 172—281)

My invention relates to electric valve converting systems and more particularly to control systems for such systems operating between alternating current circuits of the same or different frequencies.

In certain instances it is desirable to utilize an electric valve converting system operating between two alternating current circuits of the same or different frequencies one of which is also being supplied with energy obtained from another electric valve frequency converting system or a synchronous frequency changer apparatus. In such instances it is highly desirable to provide an arrangement whereby the current load power transmitted by the electric valve converting system may be regulated so that the load division between the various units is not unequal.

It is, therefore, an object of my invention to provide an improved control circuit for an electric valve converting system operating between alternating current circuits of the same or different frequencies.

It is another object of my invention to provide an improved control circuit for an electric valve converting apparatus operating between alternating current circuits of the same or different frequencies where a synchronous frequency changer apparatus is supplying energy to the same load device.

Still another object of my invention is to provide an improved electric valve converting system having such a control circuit by means of which the reactive power absorbed by the electric valve converting system from either the input or output circuit may be controlled.

For a better understanding of my invention, together with other and further objects thereof, reference is had to the following description taken in connection with the accompanying drawing in which the single figure diagrammatically illustrates the application of my invention to a system for transmitting energy between two alternating current circuits of the same or different frequencies.

Referring more particularly to the drawing, there is shown a system for transmitting energy from a three-phase alternating current circuit 10 to a three-phase alternating current load circuit 11. This apparatus includes a transformer bank provided with a three-phase primary network 12 connected to the supply circuit 10 and six three-phase star connected secondary networks 13 to 18 inclusive. The neutral points of the secondary networks 13, 14 and 15 are interconnected by a star connected network 19; the neutral points of the secondary networks 16, 17 and 18 are interconnected by a star connected network 20. The neutral points of the star connected networks 19 and 20 are interconnected by means of inductive windings 21, the mid-point of which is connected through a smoothing reactor 22 to the common cathode of a plurality of electric discharge devices, the anodes of which are connected to the outer extremities of the secondary networks 13 to 18 inclusive. The inductive networks 19 and 20 comprise the primary winding of an output transformer, the secondary winding 23 of which is connected to the output circuit 11. For the purposes of simplicity in disclosure the various electric valve devices interconnecting the outer terminals of the secondary networks 13 to 18 inclusive, with the midpoint of the inductive winding 21, have been shown as comprising a single cathode multi-anode device wherein each of the anodes is provided with a control electrode. Obviously of course it is apparent to those skilled in the art these valves may comprise other types of valves commonly known in the art although it is preferable to utilize electric valves of the type having an anode, a cathode and a control or starting electrode enclosed within an envelope containing an ionizable medium. A group of electric valves 24 which has been illustrated as consisting of a multi-anode single cathode device, but which may comprise the plurality of individual valves is provided with a control circuit so that the various anodes connected to the other extremities of the secondary networks 13 to 18 are rendered conductive in proper sequence so as to supply to the output circuit 11 alternating current of the desired frequency. Each of the control electrodes of the various arc discharge paths or valves 24 receive in effect two periodic potentials, one of which corresponds in frequency to that of the input circuit 10 and the other of which corresponds in frequency to that of the output circuit 11.

For the purposes of simplicity in describing the application of my invention and the operation thereof, it will be assumed that the alternating current supply circuit 10 is of a higher frequency than that of the alternating current output circuit 11. The alternating current output circuit 11 supplies power to a load device which also receives power from another electric valve converting system or a synchronous frequency changer apparatus. A control circuit for the valves 24 includes a source of alternating potential having a frequency corresponding to that of the input circuit 10 and this has been indicated by the polyphase circuit 25 which may be energized from the same source of power as the alternating current circuit 10. Three transformers 26, 27 and 28 are each connected so that their primary windings are energized from a different one of the phases of the alternating current circuit 25. Each of these three transformers is provided with two secondary windings which supply energy respectively to a plurality of electric valves 29 to 34 which control the energization of a plurality of control transformers 35 to 40 respectively. One of the secondary windings of each of the transformers 26, 27 and 28 is connected through a reactor 41 to the common cathode connection of all of the valves 29 to 34 and the remaining secondary windings of the three transformers 26, 27 and 28 are connected through a reactor 42 to the same common cathode connections of these valves. Each of the control transformers 35 to 40 is provided with three secondary windings which supply energy to one of the control electrodes of the anodes in different groups of valves as associated with the secondary networks 13 to 18. Thus, for example, the three secondary windings of the control transformer 35 supply energy through suitable current limiting resistors to the control electrodes or grids of the arc discharge paths associated with the upper winding of each of the secondary networks 13, 14 and 15 respectively. Similarly, the transformer 36 supplies control potentials to the control electrodes of one of the valves of each of the secondary network windings 16, 17 and 18. The potential supplied to the control transformers 35 to 40 by the valves 29 to 34 are alternating potentials having a positive period of substantially 120 electrical degrees and a negative period for the remainder of 240 electrical degrees. While each of the electric valves 29 to 34 may comprise any of the valves commonly utilized in the art, for the purposes of simplicity in explanation, they have been shown as comprising an anode, a cathode and a control grid. These control grids are energized from a plurality of transformers 43, 44 and 45, each of which is energized from a different one of the phases obtained from the alternating current supply source 25 through a suitable phase shifting device 46. Each of the control transformers 43 to 45 is provided with two secondary windings so that each winding controls one of the valves 29 to 34 respectively. The transformers 43 to 45 are furthermore provided with direct current windings 47, 48 and 49 respectively which are for the purpose varying the degree of saturation of the saturable transformers 43, 44 and 45 so that the moments of ignition of the various electric valves 29 to 34 may be controlled. The purpose of this control will subsequently become apparent. This control circuit, therefore, serves to supply to each of the control electrodes of the group of valves 29 to 34 alternating potentials which are positive for 120 electrical degrees and negative for 240 electrical degrees and which have a frequency corresponding to the frequency of the input circuit 10.

The application of the alternating potentials corresponding in frequency to the input circuit 10 is controlled by control circuits energized from a polyphase alternating current circuit 50 having a frequency corresponding to the frequency of the alternating current output circuit 11. A plurality of transformers 51, 52 and 53 are arranged so that each of their primary windings are energized from a different one of the phases of the alternating current supply circuit 50. Each of these transformers 51 to 53 is provided with two secondary windings which serve to energize a plurality of electric discharge devices 54 to 59 respectively. To each of the cathodes of the valves 54 to 59 respectively there is connected one of the resistors 60 to 65 respectively which are all connected together to a common cathode connection to which is connected an inductor 66 which in turn is connected to one of the secondary windings of each of the transformers 51 to 53, and to which is also connected another inductor 67 to which is connected the remaining secondary windings of the transformers 51 to 53. The common cathode connections joining the resistors 60 to 65 and one terminal of each of the inductors 66 and 67 is connected through a suitable source of biasing potential 68 to the common cathode connection of the group of valves 24. Each of the cathodes of the valves 54 to 59 are connected to three secondary windings of the control transformers 35 to 40 so that, for example, the cathode of the valve 54 is connected to one of the secondary windings of each of the transformers 35, 37 and 39. Likewise, the cathode of the valve 55 is connected to one of the secondary windings of each of the control transformers 36, 38 and 40. Similarly, the cathodes of the remaining devices 56 to 59 are each connected to three secondary windings of different ones of the control transformers 35 to 40. Here again, for purposes of simplicity in disclosure and explanation, the valves 54 to 59 have been shown as comprising an anode, a cathode and a control grid although any of the types of the valves commonly known in the art may be utilized. These various valves are rendered conductive in proper sequence by a control circuit comprising a plurality of transformers 69 to 71, the primary windings of which are each energized from different phases obtained from the alternating current supply circuit 50 through a suitable phase shifting device 72. Each of these control transformers is furthermore provided with a direct current saturating winding 73 to 75 respectively which serves to control the moments of ignition of the various electric valves 54 to 59 respectively. Each of these control transformers 69 to 71 is provided with two secondary windings so that each transformer controls the conductivities of two of the valves 54 to 59. Thus the valves 54 to 59 are rendered conductive in proper sequence at a frequency corresponding to the frequency of the alternating current supply circuit 50 and this in turn causes a voltage to appear across the resistors 60 to 65 in proper sequence and of such sign as to tend to render ineffective the negative biasing voltage 68. Rendering conductive the valves 54 to 59 in proper frequency produces an effect upon the control electrodes of the group of valves 24 which corresponds to impressing thereon an alternating potential having a frequency corresponding to the output circuit but which potential is insufficient of itself to cause any of the valve 24 to be rendered conductive. The various arc discharge paths of the group of valves 24 are each rendered conductive only when the effective alternating potentials supplied by the control circuit at the input and output frequency are both positive.

Thus, for example, when the valve 54 is rendered conductive the effect of the biasing voltage 68 is substantially reduced due to the voltage appearing across the resistor 60 so that the voltages supplied by one of the secondary windings of each of the control transformers 35, 37 and 39 to the control electrodes of one of the arc discharge paths of each of the secondary networks 13, 14 and 15 is in condition to render conductive the proper arc discharge path or paths at a frequency of the alternating current supply circuit 25 which in turn corresponds to the frequency of the alternating current supply circuit 10. From this it will be apparent that the various arc discharge paths of the group of valves 24 are rendered conductive in accordance with the frequencies of the alternating current supply circuit 10 and the alternating current output circuit 11.

If now it is assumed that the electric valve frequency converting system just described supplies energy to the same load device as does another frequency changer which may be of the synchronous type, there is provided a control circuit for selectively increasing or decreasing the power output of the electric valve frequency converting apparatus. The output of such other frequency changer such as a synchronous frequency changer has been indicated by the alternating current circuit 76, one conductor of which is provided with a current transformer 77 which supplies potential to a bridge rectifier circuit 78, the output of which is connected across a suitable resistor 79 which may be bypassed by a capacitor 80. The alternating current output circuit 11 of the static frequency changer apparatus has a current transformer 81 connected to one conductor of the alternating current circuit 11. The current transformer 81 is connected to energize a bridge rectifier circuit 82, the output of which is connected across a suitable resistor 83 which may be bypassed by a capacitor 84. The voltages appearing across the resistors 79 and 83 are connected to oppose each other in a circuit including a pair of unilaterally conductive devices 85 and 86 which are so arranged as to cause current to flow either through the control transformers supplying the frequency component corresponding to that of the input circuit or to the control transformer supplying the frequency component corresponding to that of the output circuit. Thus, if the synchronous frequency changer output is such as to be greater than that of the static frequency changer output the potential appearing across the resistor 79 will be sufficiently greater as to cause current to flow through the saturating windings of the control transformers 43, 44 and 45 thereby causing the moments of ignition of the electric valves 29 to 34 to be advanced in phase with respect to their former condition, thereby causing the various arc discharge paths of the group of valves 24 to be rendered conductive at an earlier time. If, on the other hand, the output of the static frequency changer is greater than that of the synchronous frequency changer the voltage appearing across resistor 83 will be such as to cause current to flow through the saturating windings 73, 74 and 75 of the control transformers 69, 70 and 71 thereby causing a retardation in the phase of the control potential supplied to the valves 54 to 59, respectively. These valves in turn will therefore delay the application of control potentials to the various arc discharge paths of the group of valves 24 thereby retarding the moments of ignition sufficiently as to reduce the power output of the static frequency changer.

Since it is believed that the operation of the system will be apparent to those skilled in the art no detailed explanation thereof is believed to be necessary, but the operation may be summed up briefly as follows: The alternating current circuit 10 which for the purposes of explanation only has been indicated as being the higher frequency circuit, supplies power to the transformer networks having a primary winding 12 and secondary network windings 13 to 15 so that the anodes of the group of arc discharge paths of valves 24 become energized in proper sequence. The control circuit for the control electrodes thereof periodically supplies substantially rectangular alternating current impulses which are positive for 120 electrical degrees and negative for 240 electrical degrees and which have a frequency corresponding to that of the alternating current input circuit 10. Due to the effect of the negative bias from the source 68 these potentials are not effective until the biasing effect has been rendered substantially ineffective by the conductivities of the valves 54 to 59 which are operated in proper sequence at a frequency corresponding to that of the alternating current output circuit 11. Thus the various arc discharge paths of the group of valves 24 are rendered conductive in proper sequence at a frequency corresponding to that of the alternating current circuit 10 in a sequence further determined by the frequency of the alternating current circuit 11. The initial output characteristics of the electric valve frequency converting system may be determined by the initial adjustment of the suitable phase shifting devices 46 and 72 which supply the alternating control potential to the control transformers 43 to 45 and 69 to 71 respectively. Whenever the output of the electric valve frequency converting system and that of the synchronous frequency changer differ direct currents are caused to flow through the proper groups of control transformers so as to cause either an incease or a decrease of the alternating current output of the electric valve frequency converting system. In order to accomplish this the phase of the output frequency control potentials is advanced in order to increase the output of the electric valve frequency converting system, and in order to decrease the output the phase of the input frequency control potentials is retarded.

While for the purpose of providing a simple illustration and explanation of my invention it has been shown as applied to an electric valve converting system operating between a polyphase higher frequency input circuit and a polyphase lower frequency circuit, it will be understood that the invention is equally applicable to systems of a different number of phases and to systems operating from a lower frequency input circuit to a higher frequency output circuit.

While I have shown a particular application of my invention for an electric valve converting apparatus, it is to be understood that this is merely illustrative as one of a number of electric valve converting systems to which my invention may be applied and that I do not wish to be limited thereto, since it is apparent that the principles herein disclosed are susceptible to numerous other applications and modifications may be made in the arrangements to which my invention may be applied without departing from the spirit and scope of my invention as set forth in the appended claims.

What I claim as new and desire to secure by Letters Patent of the United States, is,

1. The combination of an electric valve converting system interconnecting higher frequency and lower frequency alternating current circuits, said system including a control circuit for the valves thereof, said control circuit including a plurality of sources of periodic potential, the frequencies thereof corresponding respectively to those of said alternating current circuits, and means for selectively retarding the phase of said potential having a frequency corresponding to that of said input circuit, means for advancing the phase of said potential having a frequency corresponding to that of said output circuit, and means for controlling both of said last mentioned means.

2. The combination of an electric valve converting system interconnecting two alternating current circuits of different frequencies, said system including a plurality of valves each provided with a control electrode, a control circuit for said electrodes including a plurality of sources of control components having frequencies corresponding to the frequencies of said alternating current circuits, and means responsive to a deviation from a predetermined electrical condition of the output of said system for either advancing the phase of one of said components thereby to increase the power output or retarding the phase of the other of said components thereby to decrease the power output.

3. The combination of an electric valve converting system interconnecting higher frequency and lower frequency alternating current circuits, said system including a control circuit for the valves thereof, said control circuit including a source of periodic potential having a frequency equal to that of said input circuit, and a source of periodic potential having a frequency equal to that of said output circuit, means for reducing the power output of said system comprising means for retarding the phase of said potential having a frequency corresponding to that of said input circuit, means for increasing the power output of said system comprising means for advancing the phase relation of said potential having a frequency corresponding to that of said other circuit, and means for controlling both said last means.

4. The combination comprising an alternating current input circuit, a different frequency alternating current load circuit, an electric valve frequency converting system interconnecting said circuits, a second frequency converter supplying energy to said load circuit, said electric valve converting system including a control circuit for the valves thereof, a source of periodic potential for said control circuit having a frequency corresponding to that of said first mentioned circuit, a source of periodic potential for said control circuit having a frequency corresponding to that of said load circuit, and means responsive to the power output of said electric valve frequency converting system and said second frequency converting apparatus for either advancing the phase of said load frequency periodic potential or retarding the phase of said input frequency periodic potential with respect to the potentials of said load and input circuits.

5. The combination comprising an alternating current input circuit, an alternating current load circuit of a different frequency, an electric valve frequency converting system interconnecting said circuits, a synchronous frequency changer apparatus supplying energy to said load circuit, said electric valve converting system including a control circuit for the valves thereof, a source of periodic potential corresponding in frequency to that of said input circuit, a source of periodic potential corresponding in frequency to that of said output circuit, means responsive to the output of said electric valve frequency system and said synchronous frequency changer apparatus for either advancing the phase of the periodic potential having a frequency corresponding to that of said output circuit or retarding the phase of said periodic potential having a frequency corresponding to that of said input circuit.

6. The combination comprising an alternating current input circuit, an alternating current load circuit of a different frequency, an electric valve frequency converting system interconnecting said circuits, a synchronous frequency changer apparatus supplying energy to said load circuit, said electric valve converting system including a control circuit for the valves thereof, a source of periodic potential having a frequency corresponding to that of said input circuit, a source of periodic potential having a frequency corresponding to that of said output circuit, means responsive to the power output of said electric valve frequency converting system and said synchronous frequency changing apparatus for advancing the phase of said periodic potential having a frequency corresponding to that of said output circuit for increasing the power output of said electric valve frequency converting system.

7. The combination comprising an alternating current input circuit, an alternating current load circuit of a different frequency, an electric valve frequency converting system interconnecting said circuits, a synchronous frequency changer apparatus supplying energy to said load circuit, said electric valve converting system including a control circuit for the valves thereof, a source of periodic potential for said control circuit having a frequency corresponding to that of said input circuit, a source of periodic potential for said control circuit having a frequency corresponding to that of said load circuit, means responsive to the power output of said electric valve frequency converting system and said synchronous frequency changer apparatus for retarding the phase of said periodic potential having a frequency corresponding to that of said input circuit thereby to decrease the power output of said electric valve frequency converting system.

8. The combination of an electric valve converting system having a certain input frequency and a different output frequency, a control circuit for the valves of said system including a source of alternating potential being positive in duration for 120 degrees and having a frequency corresponding to that of said input frequency, a source of biasing potential for normally rendering ineffective said alternating potential, and means for periodically reducing the effect of said biasing potential at a frequency corresponding to that of said output frequency.

9. The combination of an electric valve converting system interconnecting two alternating current circuits of different frequencies, said system including a control circuit for the valves thereof, said control circuit including a plurality of sources of periodic potential having frequencies corresponding to said input and output circuits, means for reducing the power output of said system comprising means for retarding the phase relation of said control potential having a frequency corresponding to that of said input circuit, and means for increasing the power output of said system comprising means for advancing the phase relation of said control potential having a frequency corresponding to that of said output circuit.

10. The combination of an electric valve converting system having a certain input frequency and a different output frequency, the control circuits of the valves of said system including a source of alternating potential being positive in duration for 120 degrees and having a frequency corresponding to that of said input circuit, means for retarding the phase of said potential with respect to the potential of said input circuit, a source of biasing potential for normally rendering ineffective said alternating potential, means for periodically reducing the effect of said biasing potential at a frequency corresponding to that of said output frequency, means for advancing the phase relation of the operation of said latter means with respect to the potential of said output circuit, and means responsive to a predetermined electrical condition for controlling both of said phase shifting means.

11. In combination, a plurality of electric supply circuits one of which includes an electric valve means having an anode, a cathode and a control electrode, a load circuit connected to be energized by said supply circuits, a plurality of control potentials for controlling the conductivity of said electric valve means, means responsive to the respective power outputs of said supply circuits for controlling said control potentials to maintain a predetermined division of load between said supply circuits.

12. In combination, a plurality of alternating current supply circuits one of which includes an electric valve means having a cathode, an anode and a control electrode, a load circuit connected to be energized by said supply circuits, a plurality of control potentials for controlling the conductivity of said electric valve means, rectifying means responsive to the power outputs of said supply circuits for deriving potentials each proportional to the respective power output, and means responsive to said latter potentials for selectively controlling one of said control potentials to maintain a predetermined division of load between said supply circuits.

13. In combination, a plurality of electric supply circuits one of which includes electric valve means having an anode, a cathode and a control electrode, a load circuit connected to be energized by said supply circuits, a plurality of control potentials for determining the conductivities of said electric valve means, means for deriving direct current potentials each proportional to the respective power outputs of said supply circuits, and means responsive to said latter potentials for selectively controlling one of said control potentials thereby to maintain a predetermined division of load between said supply circuits.

AUGUST SCHMIDT, JR.